United States Patent [19]

Reynolds et al.

[11] 4,445,214

[45] Apr. 24, 1984

[54] METHOD OF CONTROLLING MESSAGE TRANSMISSION SEQUENCE IN MULTI STATION COMMUNICATION SYSTEM

[75] Inventors: Christopher C. Reynolds, Satellite Beach; Earl J. Claire, Melbourne Beach; John R. Ellis, West Melbourne, all of Fla.

[73] Assignee: Harris Corporation, Melbourne, Fla.

[21] Appl. No.: 370,857

[22] Filed: Apr. 22, 1982

Related U.S. Application Data

[62] Division of Ser. No. 154,825, May 30, 1980, Pat. No. 4,332,980.

[51] Int. Cl.³ .............................................. H04J 6/00
[52] U.S. Cl. ........................................ 370/94; 370/85; 340/825.5
[58] Field of Search ........................... 370/94, 92, 85; 340/825.5, 825.51, 825.54

[56] References Cited

U.S. PATENT DOCUMENTS

| 4,074,232 | 2/1978 | Otomo et al. | 370/94 |
| 4,096,355 | 6/1978 | Rothauser et al. | 370/94 |
| 4,342,995 | 8/1982 | Shima | 340/825.5 |

FOREIGN PATENT DOCUMENTS 54-39504 3/1979 Japan .................................. 370/94

Primary Examiner—Douglas W. Olms
Attorney, Agent, or Firm—Antonelli, Terry & Wands

[57] ABSTRACT

A communication scheme for a multi station message transmission system involves the transmission of messages from one station to another, a return message from the receiving station and the retransmission of a previously transmitted message if an acknowledgement is not received. Each message, which may or may not contain data, includes a header having a sequence bit and an acknowledge bit. Each station within the communication system stores in memory a transmit sequence bit and a receive sequence bit. The header of each message that is transmitted from a given station contains a sequence bit corresponding to the state of the transmit sequence bit stored at that station. When a message having an acknowledge bit is received, the state of the stored transmit sequence bit is switched. Upon receipt of a data message having a sequence bit that corresponds to that of the stored received sequence bit at that station, the state of the stored received sequence bit is switched and an acknowledge bit-containing message is returned. If the acknowledge bit is not received from receiving station in a predetermined time after the initial transmission, the previously transmitted message is retransmitted. When the state of the sequence bit in the message is different from that of the received sequence bit stored at the station, and incoming message is disregarded.

6 Claims, 27 Drawing Figures

METHOD OF CONTROLLING MESSAGE TRANSMISSION SEQUENCE IN MULTI STATION COMMUNICATION SYSTEM

This is a division of application Ser. No. 154,825 filed May 30, 1980 now U.S. Pat. No. 4,332,980.

FIELD OF THE INVENTION

The present invention relates in general to data communication systems, and more particularly, to a multiple services system using telephone transmission lines to link a subscriber data subsystem to a central office data subsystem, over which various data services may be supplied to the subscriber on request, information may be obtained from the subscriber on demand, and signaling may be transmitted to energizing and security services in response to alarm conditions, without interference with normal telephone services.

BACKGROUND OF THE INVENTION

Numerous systems have been developed over the years which utilize telephone lines, power lines and CATV lines for carrying signals of all types representing alarm conditions, data readings, survey data, and various types of control signals to initiate control functions. Such systems are attractive from an economical point of view in that they take advantage of existing transmission media and, therefore, like radio and television, make possible long-range communications and transmission of control and data signals without large expenditures for the transmission media itself. However, such systems have to date been used for the most part for the transmission of alarm, survey and control signals and have been generally unavailable to the individual subscriber for handling a broader range of data communications and services, and those systems which are in use require dedicated access to the data service, which is expensive and inefficient.

Television has greatly increased the communication of data to the home over that provided by radio in that it involves both a visual and aural commuication. However, commercial television, like radio, provides a unilateral service in that the viewer basically is capable of receiving only that which others wish to transmit at any given time. Prior services systems which utilized the telephone, power and CATV lines were also, for the most part, unilateral systems in that such systems were designed to transmit information only in a single direction, i.e, from the subscriber to power, security and other service companies. In those systems designed for remote meter reading and audience survey, control signals were transmitted to individual subscribers and in response thereto the data was transmitted automatically to the collecting agency; however, in these systems the subscriber had little or no control over the information being transmitted and certainly had no power or capability of envoking the receipt of data on request.

The world is presently at the doorstep of the next great advance in the extension of data services to the private sector of the community. Data processing systems have already become the indispensable tool of the business and scientific communities, providing word processing, data retrieval, systems analysis, reservations control and may other services on various levels of sophistication. However, such services can also be made available to the individual subscriber in his home by way of available telephone lines. The provision of multiple services to the telephone subscriber represents a fascinating prospect for the future, which encompasses a broad range of technologies for delivering such services, including satellite, coaxial cable and fiber optic systems.

However, in systems designed to handle both alarms and data communication, problems are encountered in handling both types of signals without undue complexity and without having to buffer the data and interleave it with the alarms. In addition, where multiple services are to be made available to the subscriber, some means must be provided to access different types of terminals at the customer premises on a selective basis in a way which is compatible with the reporting of alarms and other conditions as desired.

It is therefore a broad object of the present invention to provide a multiple service broadband system for existing telephone local loop service.

It is a further object of the present invention to provide a system of the type described which will be transparent to normal telephone service while providing a multiplicity of new services including data service communication, alarm communication and energy management.

It is a further object of the present invention to provide a system of the type described which includes a modular data service switching arrangement integrated into the basic security system switch to permit faster switchover and interleaving of data service and alarm and automatic meter reading data.

It is still another object of the present invention to provide a system of the type described in which data service support is independent from data rate code, format and protocol of the data service system.

It is still a further object of the present invention to provide a system of the type described which operates on the basis of a sophisticated communications protocol with error detection and retransmission to minimize false alarms and erroneous data.

It is another object of the present invention to provide a system of the type described having increased flexibility and expandability to allow for system growth in terms of both services and the number of subscribers served.

BRIEF DESCRIPTION OF THE INVENTION

The present invention provides a multiple services broadband system which expands the use of the twisted-pair telephone distribution network, immediately allowing the integration of many future services with conventional telephone service over existing and familiar transmission media in such a way as to allow both services to be used simultaneously. The system in accordance with the present invention comprises a security and data system which is capable of serving a large number of both residential and commercial subscribers, providing a unique integration of both alarm and data handling functions in a single system.

One of the features of the present invention relates to the provision of a subscriber security system supporting self-test and monitor verification, with continuous monitoring and central reporting of (a) automatic intrusion detection; (b) automatic heat, smoke and cold detection and manual fire alert; (c) manual police alert; (d) manual medical alert; (e) maintenance features; and (f) standalone operation. Services such as automatic utility meter reading and energy management load shedding are also provided.

A second aspect of the present invention relates to the provision within the system of a central data service interface, distribution control and subscriber data service interface which provides for the extension of a broad range of data services to the subscriber on request. Data services such as provided by Videotex in the United States and Teledon in Canada cover a wide range of data services and provide unlimited possibilities for data communication to the residential subscriber on a scale not heretofore possible or practical. For example, both local and distant telephone directory service could be provided to the individual residential subscriber by way of his home television set, eliminating the need for telephone directories, including classified directories, and thereby eliminating the huge costs involved in the printing and distribution of such publications. All types of information and statistics, including educational materials, can also be made available through the data service, along with the availability of centralized data processing equipment which would otherwise be far beyond the economic reach of the individual subscriber.

Two different system approaches are available in accordance with the present invention to permit services to be provided to both new subscribers, in locations where the serving area concept of telephone service is being employed, and to existing subscribers served by a conventional local loop system. In this regard, where the serving area concept is being employed, the communication system uses the spare pair local loop from the subscriber data system to the junction wire interface box and a multiplexed T1 data channel from the junction wire interface to the local exchange office. On the other hand, for existing subscribers which are served by a conventional local loop system, a data-above-voice approach is used to make possible multiple services communication which is transparent to the normal telephone transmission. The present invention is therefore available for use in both urban and rural areas for homes and business office applications.

The system in accordance with the present invention includes central office computer control for the automatic monitoring and control of the various services to be transmitted, and it features a microprocessor controlled subscriber unit for flexibility in the transmission of such services. Thus, the system's basic function is to expand the use of the twisted pair telephone distribution network, while additional services are integrated with the basic telephone service over the same transmission media in such a manner that they are transparent to the telephone service, permitting the add-on services and the telephone to be in use simultaneously.

Master control over the system is exercised by a central control system whose task includes performing recognition, verification and reporting of alarms received from the subscriber; meter reading; relaying energy management and load shedding commands from utilities to subscribers; and network testing and control. Reporting of alarms is handled in a number of ways including aural/visual indicators, printers and display devices located within the central office area and by data links extending to such devices remotely located at emergency centers. The system also provides a two-way data path to urban residential subscribers over the conventional (copper pair) telephone exchange plant which allows simultaneous use of the telephone (signaling, supervision, talking) and the home data services without interference between the two services. However, the data signals provided by the system are not directed through the telephone exchange switches provided for voice message traffic, but use physically-separate paths for voice-band data. This is provided by 1200-baud half-duplex information transmission between the subscriber and the local exchange office, which provides for data transmission at reduced cost.

A remote multiplexer, which is located adjacent to the jumper wire interface accepts 1200-baud data from the subscribers lines and encodes it into a T1 rate (1.544 mbps) bit stream. In the opposite direction of transmission, the demultiplexer processes the bit stream and a T1-type line transmits the 1.544 mbps bit stream between the remote multiplexer and a similar multiplexer located in a local exchange office.

Security, control and data services are provided to the home subscriber through various panels, interfaces and alarm sensors attached to a subscriber data system located on the subscriber's premises. The heart of the subscriber data system is a microprocessor-controlled subscriber control processor. Security services are available to the subscriber through manual panels and alarm sensors whose inputs are detected by the subscriber data system and communicated to the central control system. Manual-alerting panels (with pushbuttons) enable the subscriber to alert an appropriate emergency service. Distinct alert messages for police, fire, medical and the like are received at the central control center to expedite the appropriate response.

Through the operation of the microprocessor-controlled subscriber control processor, the subscriber data system provides a self-test and subsystem testing capability to assure that failure of critical services (fire, intrusion, emergency alert) are brought to the attention of the central control system. Additionally, an enunciator system warns the subscriber when automatic or manual devices in the home are activated (for verification) from the central control system.

A switching communications controller provided at the central exchange maintains communication with the various subscriber data systems to detect alarms, failure conditions or requests for data service. Any change in status at a subscriber data system is reported to the central control system. Upon request from a subscriber data system, the switching communications controller simply switches the subscriber's communication channel to one of a plurality of available data service ports, but on a non-dedicated line basis, so that services are time-shared between subscribers. Each data service interface port supports asynchronous ASCII communications at a data rate of 1200-baud.

The data service is preferably made available at several locations in the subscriber's home or business by means of a subscriber data bus. Access to the data bus is gained through plug-in jack connections, with data bus and jack locations being provided in parallel with the telephone wiring for simultaneous access to telephone and data service at each location.

Security functions and meter reading are performed under control of a central control system computer, which exercises master control over the system, including recognition, verification and reporting of subscriber alarms, meter reading, network testing and control. On a per-subscriber basis, the central control system maintains constant communications with the switching communications controller; receives and logs all alarm indications; reports emergency and maintenance alarms to a selected, manned terminal, sorts all emergency alarms and routes them to a 911-center; provides detailed information to complete an alarm printout; reads meters at preset intervals or on demand and flags readings outside a predetermined range.

Finally, communications within the system are effected on the basis of a predetermined protocol, i.e., rules governing message transactions between the various elements of the system, to permit orderly and efficient use of the communication facilities. All communications are in asynchronously-transmitted characters which are combined into units referred to as packets. Each packet will contain a link control field which includes information relative to the format and validation of the packet itself, as well as sequence control of communications between units, to ensure error-free transmission of data.

With the system of the present invention, not only may alarm, control and other signaling be transmitted to and from the subscriber's own premises using the existing telephone lines, but a broad range of data services may be made available to the subscriber in his home in a unique and efficient way. This not only includes access to available data services, but also interconnection with other subscribers over the data lines and connection to packet switching systems for long-range electronic mail service.

These and other objects, features, and advantages of the present invention will become more apparent from the following detailed description of preferred embodiments of the invention when taken in conjunction with the accompanying drawings.

DETAILED DESCRIPTION OF THE PREFERRED EMBODIMENTS

Figure 1:
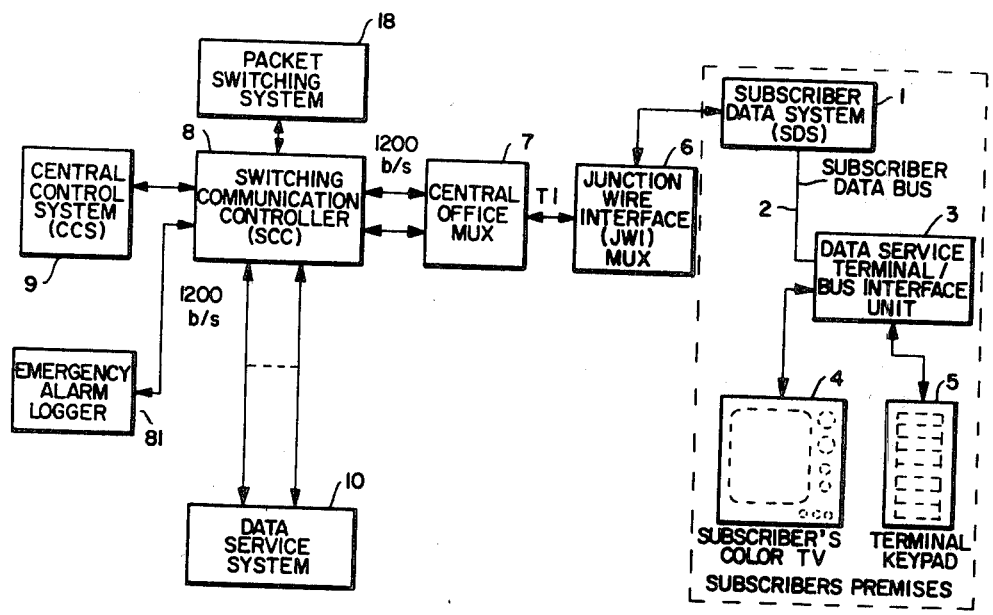
FIG. 1 is a schematic block diagram of the communication system in accordance with the present invention.

The system in accordance with the present invention, which is illustrated in its most-basic form in FIG. 1, is implemented as a distributed processing network with serial data links between the various processors. Each subscriber, either residence or business, will have its own subscriber data system 1, which is a microprocessor controlled unit capable of handling the security, control and data services at the subscriber premises.

Associated with the subscriber data system is a subscriber data bus 2 into which the subscriber may plug various peripheral units throughout the subscriber premises, such as a television set 4 and terminal key pad 5, via a data service terminal/bus interface unit 3. The unit 3 communicates with the subscriber data system 1 over the control communications lines of the subscriber data bus to request and receive permission to use the subscriber data system link T1 to the central exchange via the junction wire interface multiplexer 6.

The central office end of the T1 link is connected by way of a multiplexer 7 to a switching communication controller 8, which maintains communication with the subscriber data systems 1 to detect alarms, failure conditions or requests for data service, selectively interconnecting a subscriber data system 1 with a central control system 9 for transmission of alarm signals and energy management control signals, while connecting the subscriber data system 1 to a data service system 10 upon request to provide for communication of data services to the subscriber, to a packet switching system 18 for transmission of messages to distant locations, or to other communication and data processing systems at the request of the subscriber. Thus, the system in accordance with the present invention is basically made up of two subsystems, i.e., a subscriber subsystem linked through the available telephone lines to a central office subsystem.

Figure 2:
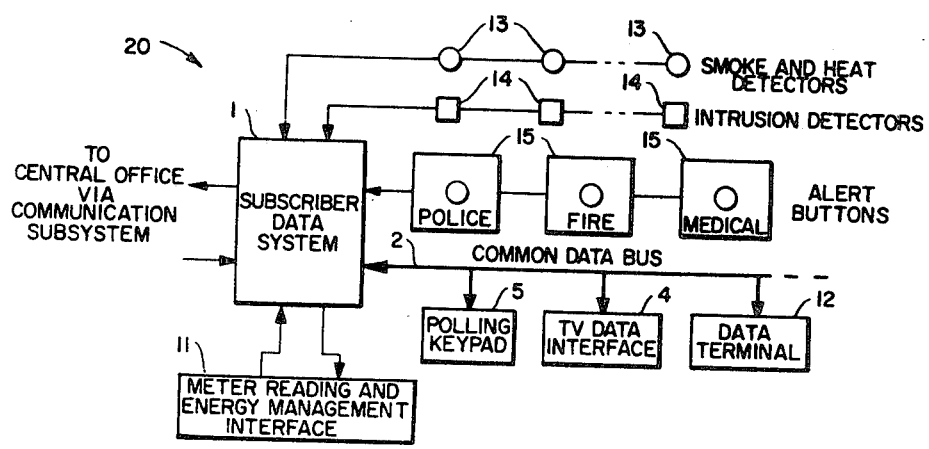
FIG. 2 is a schematic diagram of the subscriber's subsystem portion of the system of FIG. 1.

FIG. 2 illustrates the basic arrangement of the subscriber subsystem, the heart of which is the subscriber data system 1 linked to the common data bus 2. The subscriber data system 1 is based on an intelligent microprocessor, such as provided in the Intel 8085 microprocessor family, for formatting and coordinating communication with the central office subsystem. Dedicated wiring connects fixed location sensors, such as smoke and heat detectors 13 and intrusion detectors 14, throughout the subscriber's premises to the subscriber data system 1. In addition, various manually-operable alert buttons 15 for police, fire and medical alert are connected to the subscriber data system 1, these alert buttons 15 being preferably disposed at convenient locations in the subscriber's premises for emergency use.

Meter readings may be reported to the central office subsystem on a periodic basis or on demand from the central office, and energy management commands received from the central office are routed by the subscriber data system 1 to the appropriate control interface, via the meter reading and energy management interface 11.

Data services are made available at several locations in the subscriber's home or business by means of the common data bus 2, which makes allowance for the portable nature of such devices as the television 4, key pad 5 and data terminal 12, as well as for flexibility in adding or changing services at the subscriber premises.

Figure 3:
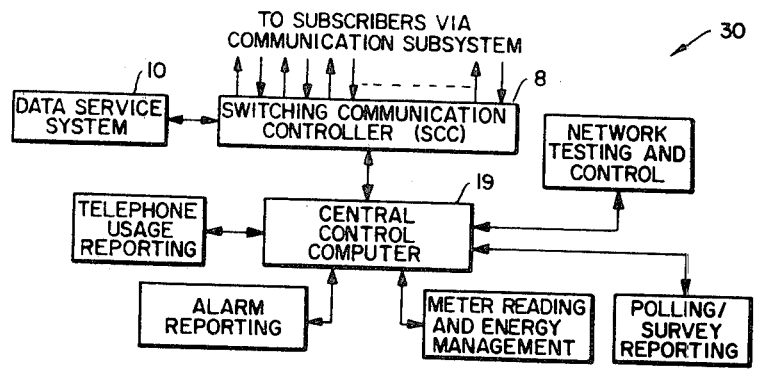
FIG. 3 is a schematic diagram of the central office subsystem of the system of FIG. 1.
Figure 4:
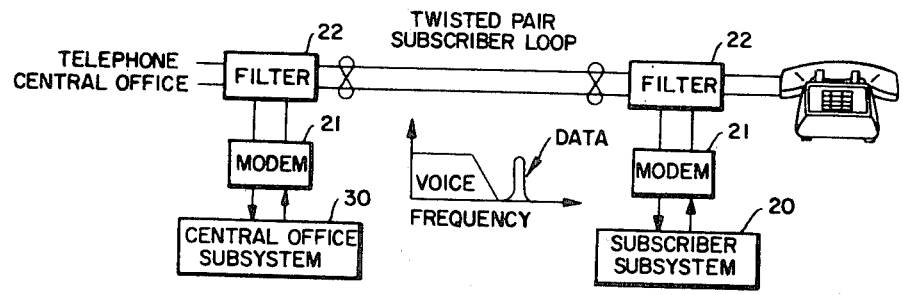
FIG. 4 is a schematic block diagram showing the data-above-voice communication scheme available with the system of FIG. 1.

The central office subsystem is illustrated in functional block diagram form in FIG. 3. The key to the system's flexibility is found in the microprocessor-controlled switching communication controller 8, which provides the switching and interface functions between the data service system 10 and the central control computer 19 in the central control system 9 and the subscriber subsystem 20 via the communication link. The central control computer 19 performs a multiplicity of functions including telephone usage reporting, alarm reporting, meter reading and energy management control, network testing and control, and polling/survey reporting. In this regard, the central control computer 19 exercises master control over the system, maintaining constant communications with the switching communication controller 8, receiving and logging all alarm indications, reporting emergency and maintenance alarms, sorting all emergency alarms, providing detailed information to complete alarm printouts, reading meters at preset intervals or on demand and flagging readings outside a predetermined range. The central control computer 19 also automatically tests the entire network to ensure troublefree operation and error-free communications.

Figure 5:
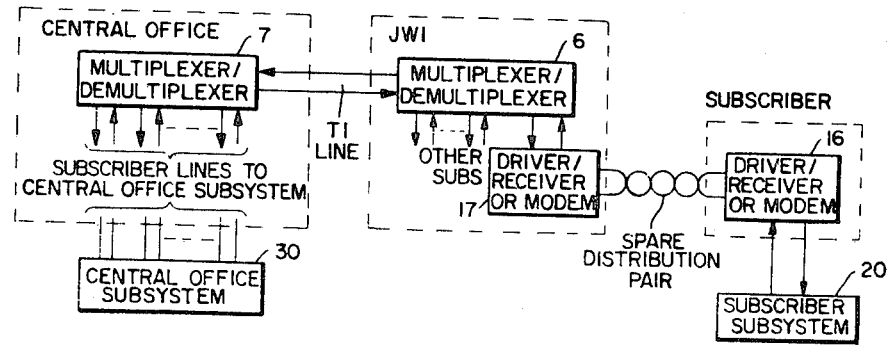
FIG. 5 is a schematic diagram of the separate data path approach available with the system of FIG. 1.

Two different technical approaches are available in accordance with the present invention for effecting communication between the subscriber subsystem 20 and the central office subsystem 30 using the available telephone lines. One approach involving data-above-voice techniques is illustrated in FIG. 5. This approach uses only one twisted pair to link the subscriber to the central office for both the telephone and services communication. The subscriber's subsystem 20 is connected via a modem and filter 22 to the twisted pair subscriber loop at the subscriber's premises and the communication received at the central office is applied to the central office subsystem 30 via a similar filter 22 and modem 21 arrangement which provides band separation and transmission of the data in the 5 to 10 KHz band.

Figure 6:
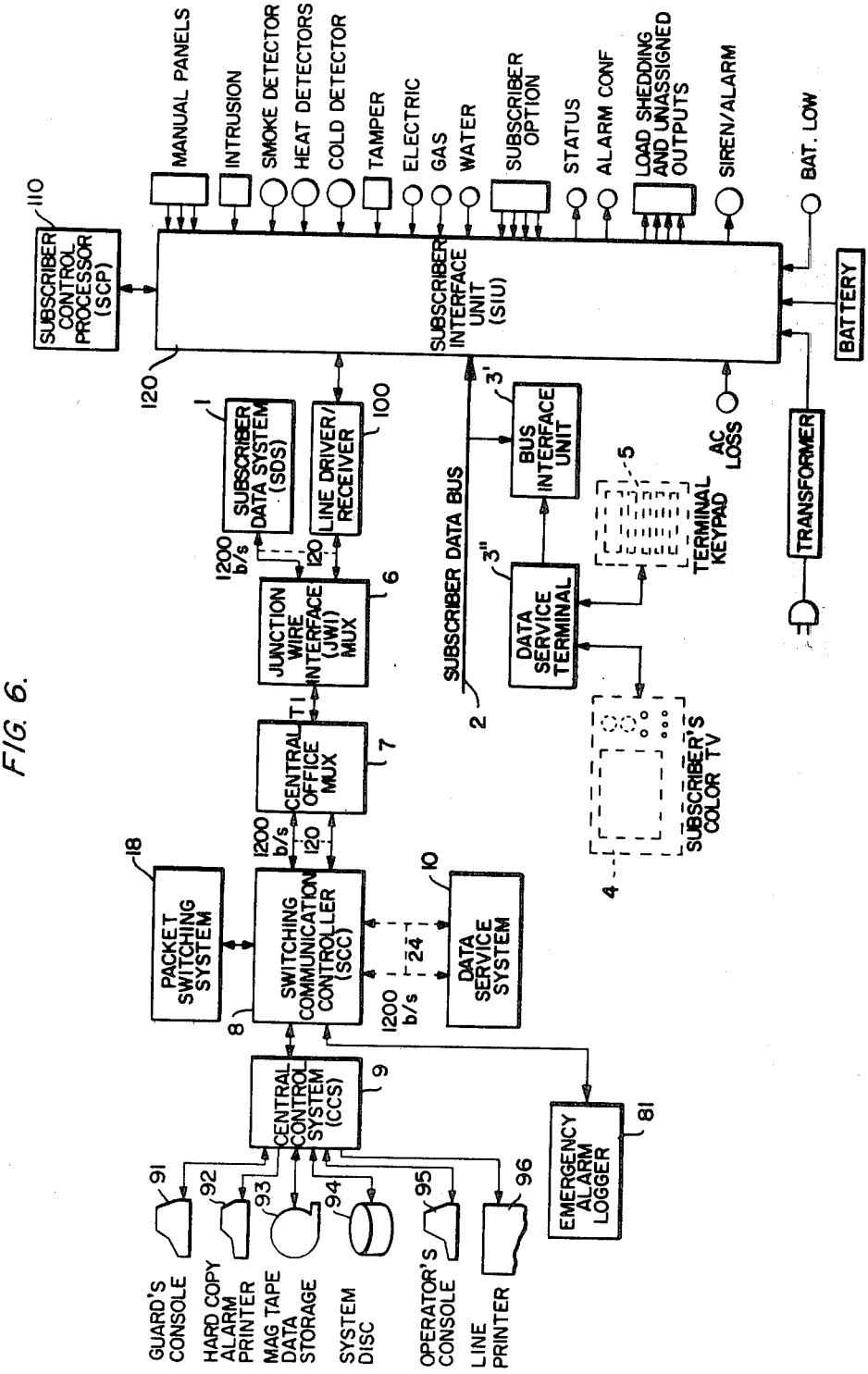
FIG. 6 is a schematic diagram of the system of FIG. 1 showing somewhat more detail of the subscriber data system and the central control system.

The second approach available in accordance with the present invention, as illustrated in FIG. 6, takes advantage of the Serving-Area concept in local telephone service distribution in which feeder cables are run to a distribution cabinet serving a few hundred subscribers in a local area. It is common practice to provide two distribution pairs to each subscriber in such a system, one for normal telephone service and one as a spare. Signaling in accordance with the present invention is therefore effected using the spare distribution pair between the distribution point and the subscriber. The signals received from the subscriber subsystem 20 are applied via a driver/receiver or modem 16 over the spare distribution pair to a similar driver/receiver or modem 17 for application to the multiplexer/demultiplexer 6 in the distribution cabinet of the junction wire interface. These signals are then carried over the T1 link using screened pairs to the central office where the signals are demultiplexed by multiplexer/demultiplexer 7 and applied to the central office subsystem 30.

While FIG. 1 discloses the system in accordance with the present invention on the basis of the separate data path approach to communication over the telephone lines, it is apparent from the discussion in connection with FIGS. 5 and 6 that either the data-above-voice approach or the separate data path approach may be implemented in the system of the present invention, or both approaches may be incorporated into the same system. In this way, the system is available for use in both new and old areas, finding application in both rural and urban areas for homes and business office applications.

FIG. 6 illustrates the system of FIG. 1 with further details of the subscriber subsystem and the manner in which it interfaces in the system, as well as some of the various peripheral devices which may be connected to the central control system 9 for monitor and control purposes. As seen in the figure, each subscriber data system 1 is made up of a subscriber interface unit 120 controlled by the subscriber control processor 110, which controls the functions to be performed within the subscriber subsystem. Security services are available to the subscriber through the manual panels and alarm sensor equipment, with inputs from these panels being detected and forwarded to the central control system 9 via the switching communication controller 8, which acts as a concentrator for such purpose. Manual alerting panels for alerting the appropriate emergency services are also provided for each subscriber to cause distinct alert messages at the central control system 9 for police, fire and medical emergencies to permit different operational reaction procedures.

In addition to its primary function of controlling the subscriber subsystem, the subscriber control processor 110 has a self-test and subsystem testing capability to assure that failures in the subscriber subsystem are brought to the attention of the central control system 9, insofar as critical services, such as fire, intrusion and emergency alert, are concerned. On one of the panels, an indicator lamp (not shown) is provided to indicate communication activity with the central control system 9 to assure the subscriber that the system is functioning. The siren/alarm system is activated when automatic or manual devices is the home are activated. An annunciator is activated upon verification from the central office system 9 that the alarm has been received.

The switching communications controller 8 recognizes the loss or absence of communications to each subscriber subsystem and generates an alarm message at the central control system 9 for each such loss. When communications to a subscriber's subsystem are interrupted, and polling has stopped, an indicator lamp is provided to inform the subscriber; however, the subscriber's subsystem continues to operate on its own without connection to the central control system 9, providing local alarm and meter accumulation functions.

Security functions and meter reading are performed under control of the central control system 9. In addition, meter-reading data will be gathered by the system 9 and transferred onto magnetic tape in a magnetic tape data storage unit 93 for processing by an external computer. The central control computer 19 which forms the heart of the central control system 9 may be provided in the form of a DEC PDP-1134A Computer, which will exercise master control over the system. In addition, a secondary communication port in the service interface controller provides alarm and network status reports to an emergency alarm Logger 81 or secondary control system in the event of loss of communication with the central control system.

When an alarm condition is reported to the central control system 9, via the switching communications controller 8, the system will provide the demographic information to complete an alarm printout on the hardcopy alarm printer 92. One line of up to 64 characters of information will also be printed, normally containing the subscriber's name and address. In addition, up to two other lines of demographic information are available for each specific alarm condition, such as fire, assault, intrusion, cold, etc. These lines will be printed when the corresponding type of alarm occurs and usually contain information such as the type of structure, medical problems, or friends' and relatives' phone numbers on the basis of information stored in the mag type data storage unit 93 or system disc storage unit 94.

The central control system 9 will receive all alarm indications from the subscriber through the switching communications controller 8 and will report emergency and maintenance alarms via the guard's console 91 with appropriate demographic data retrieved from the disc unit 94, identifying pertinent alarm and subscriber specific information. All emergency alarms will be acknowledged by the guard's console 91 to inhibit continuous activation of the console's audio alarm function.

Automatic meter-reading data will be requested automatically at preset intervals or by operator demand via the operator's console 95. Commands generated through the switching communications controller 8 will cause the accumulated totals in the subscriber data system 1 to be transmitted upstream to the central control system 9, where the new readings will be checked for range and roll-over and these readings will be used to update the master meter-reading files stored in the system disc 94. New reading increments outside a predetermined range will be flagged for further investigation and correction as necessary.

The line or character printer unit 96 will be used for the output of statistical data accumulated by the system, the output of automatic meter-reading data for review, as well as a backup for the hardcopy alarm printer 92.

Figure 7:
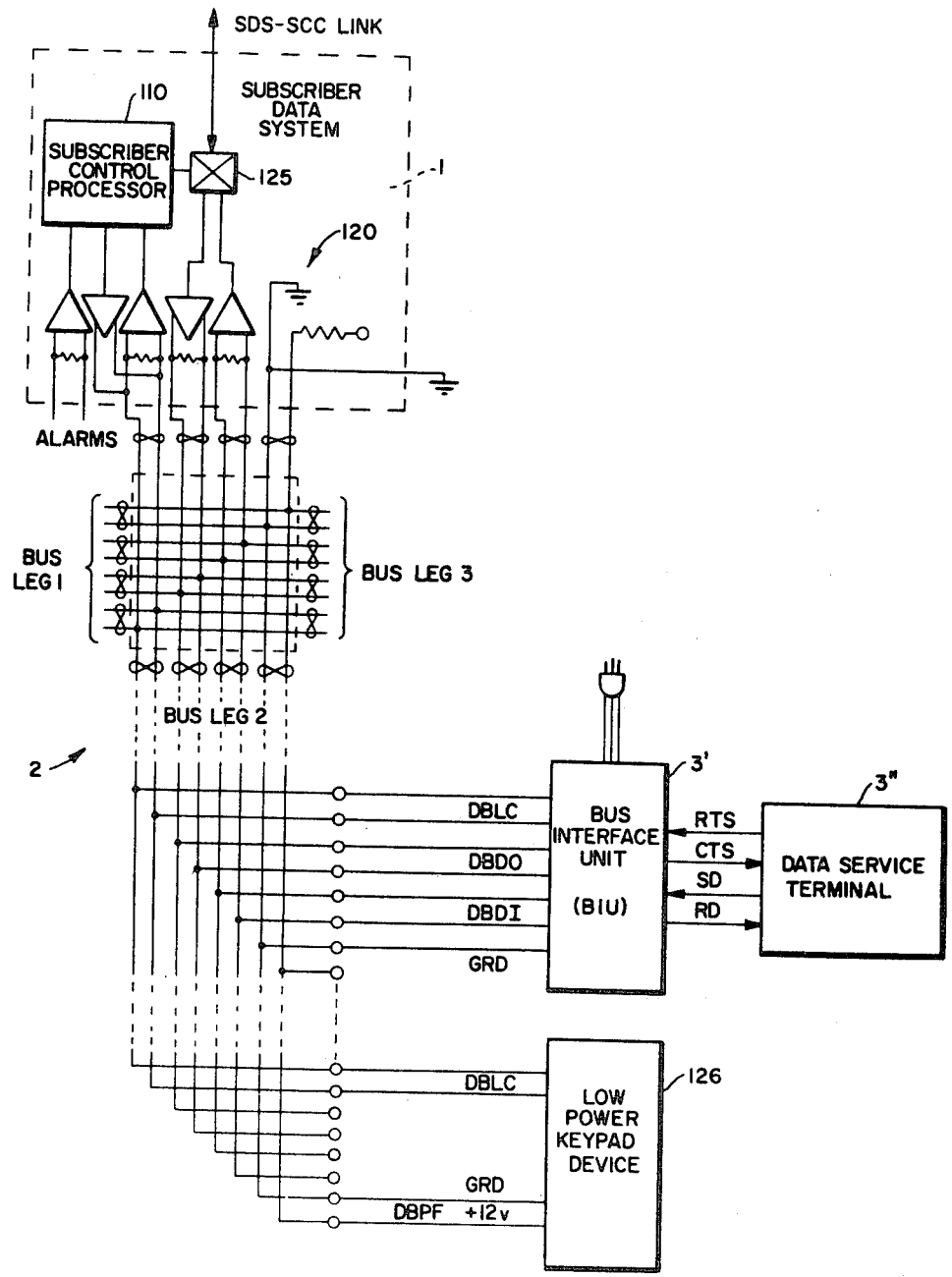
FIG. 7 is a schematic circuit diagram showing details of the interconnections of the subscriber data bus in the subscriber subsystem.

FIG. 7 illustrates in greater detail the configuration of the subscriber data bus 2 and its interconnection to the subscriber data system 1. The subscriber data bus 2 serves to provide data service access via the subscriber data system 1 through multiple pre-wired data jacks distributed throughout the subscriber's premises. The subscriber data bus 2 originates at the subscriber data system 1 and provides for multi-dropped serial data links between the subscriber data bus and either bus-compatible data service terminals or the combination of a bus interface unit 3' and compatible data service terminal 3", as illustrated.

The bus 2 consists physically of four twisted pairs wired in parallel, which may be distributed in four star-wired legs up to a maximum of 100 feet on each leg. Each leg can be daisy-chain wired to a plurality of mini-jacks, as illustrated in FIG. 7. The four twisted pairs which make up the bus are designated DBLC DBDO DBDI and DBPF. The twisted pair designated DBLC provides the data bus link control circuit, which is a half-duplex multi-dropped link provided to communicate control data between the subscriber data system 1 and multiple bus interface units 3' in the standard data link control protocol for multi-point data links, as will be described in greater detail hereinafter, with the subscriber data system 1 operating as the primary station. The twisted pair DBDO represents the data bus data-out circuit, which is used to carry data from the data service system 10 via a line switch 125 in the subscriber data system 1 under control of the subscriber control processor 110 to a bus interface unit 3'. The twisted pair DBDI represents the data bus data-in circuit, which is used to carry data from a bus interface unit 3' via the line switch 125 to the data service system 10. The fourth twisted pair DBPF in the bus 2 is used to provide power to small, low-power devices that may be attached to the bus, such as a low-power key pad device 126.

Link control over the subscriber data bus 2 is exercised through the standard system multi-point protocol with the subscriber data system 1 acting as the primary station operating over the DBLC circuit. Information communicated over this link between the subscriber data system 1 and a bus interface unit 3' is used to determine and control the status of the terminal and to identify the type of terminal and other information with respect thereto, as will be described more fully hereinafter. For data service terminals, the subscriber data system 1 takes action to connect the DBDO and DBDI circuits of the bus 2 through the line switch 125 to the communication link which extends to the central office upon receipt of a request to send (RTS) message. When the line switch 125 has been set up to connect the transmit line to the data service system 10, the subscriber data system 1 indicates the clear-to-send (CTS) status to the bus interface unit 3'. On receipt of the CTS signal from the subscriber data system 1, the bus interface unit 3' may then connect the transmitted data and received data circuits directly to the subscriber data bus lines DBDI and DBDO, respectively, through the appropriate line drivers and receivers which form part of the subscriber interface unit 120, as seen in FIG. 7. The data service switch control allows for the transmission of one complete upstream message followed by one complete downstream message. The downstream message will be monitored by the subscriber data system, and a command canceling the clear-to-send (CTS) status will be sent to the bus interface unit 3' following completion of the downstream transaction. To avoid risk of contention with a downstream message, a data service terminal 3" must not attempt a second upstream transmission following the dropping of the clear to send status, but should proceed through another RTS/CTS cycle. As is apparent from the foregoing description, all communications over the subscriber data bus 2 are asynchronous and do not require the use of timing interchange circuitry.

Figure 8:
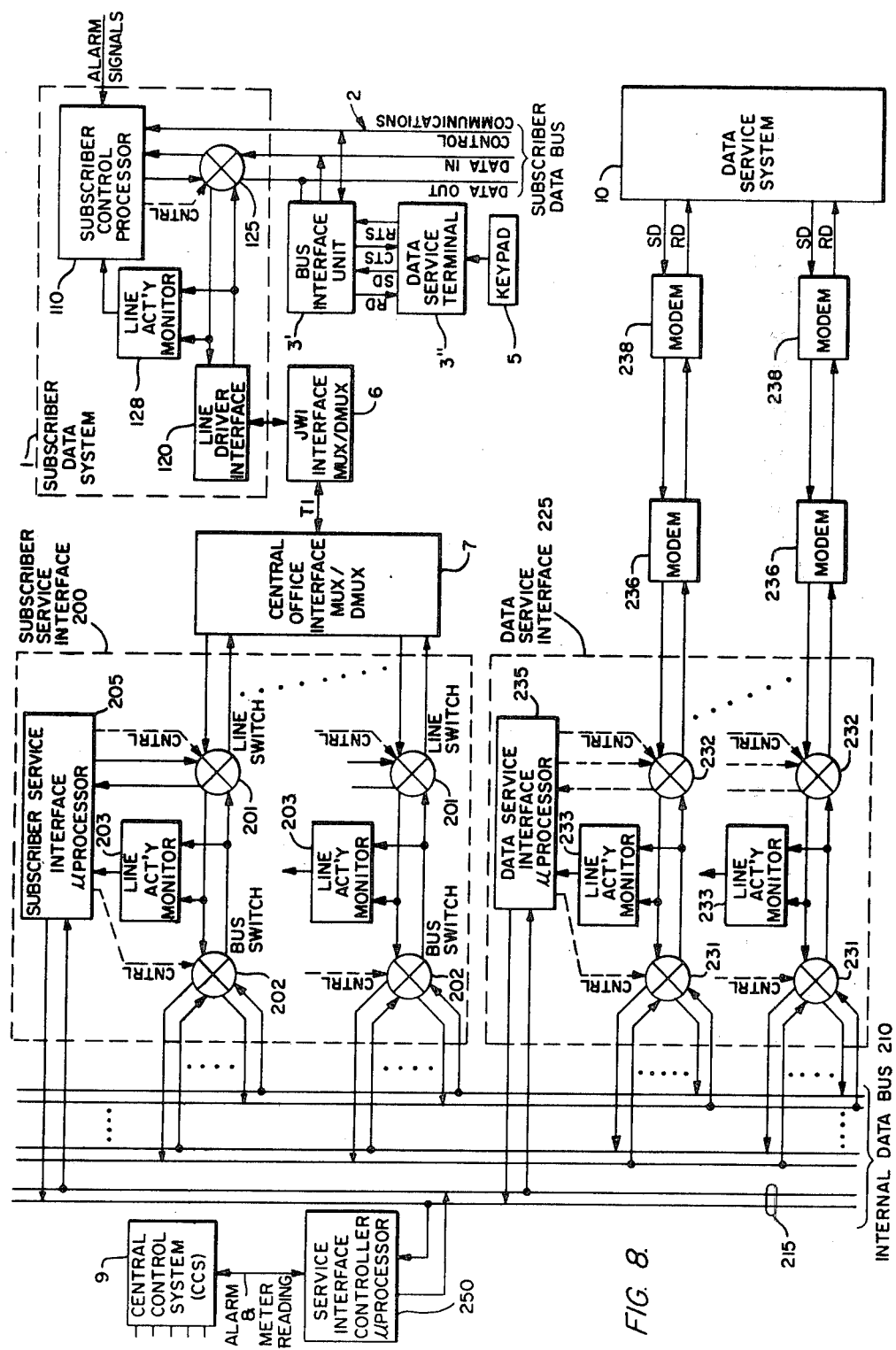
FIG. 8 is a schematic diagram of the data service switch arrangement showing part of the switching communications controller, subscriber subsystem and data service system.

The detailed configuration of the switching communication controller 8 in accordance with this invention is illustrated in FIG. 8. Beginning with the subscriber data system 1, the subscriber control processor 110 controls access to the subscriber data bus 2 by individually polling the various terminals connected thereto. All subscriber's terminals use a bus interface unit 3', or equivalent circuitry within the terminal, to communicate with the subscriber data system 1 over the bidirectional serial control communications' line DBLC of the bus 2. The subscriber data system 1 also maintains control of a line switch 125 which allows it to communicate upstream to the rest of the network, or to turn the line over for use by the data service system 10, a packet switching network 18 or other communication or data handling system. Since the subscriber data system 1 will not eavesdrop on the data service system 10 when the line is switched over, a line-activity monitor 128 is provided to allow the subscriber control processor 110 to detect when the data service system 10 has completed a data transfer and to recognize fault modes.

The switching communication controller 8 is made up of a plurality of subscriber service interfaces 200 and a plurality of data service interfaces 225 interconnected by way of an internal data bus 210. Although a plurality of subscriber service interface circuits 200 are provided in the switching communications controller 8, a single circuit 200 is illustrated in detail in FIG. 8 highlighting one subscriber's path.

Within the subscriber service interface 200 there are two switches involved in providing data service to each subscriber under control of a subscriber service interface microprocessor 205. One switch in the form of a line switch 201 allows the processor 205 to communicate with a particular subscriber data system 1 for normal communications via the telephone transmission lines in a manner transparent to normal telephone service or to select data service via the bus switch 202 under control of a service interface controller microprocessor 250. The bus switch 202 in conjunction with the line switch 201 serves to connect the subscriber's lines directly to one of the paths in the internal data bus 210, each path including two data lines which extend to the data service interface circuits 225. Again, since the microprocessor 205 will not eavesdrop on the data service applied through the bus switch 202, a line activity monitor 203 is used to sense an inactive line following transmissions and exception conditions. Alarm, meter reading and various control signals which are passed between the subscriber data system 1 and the central control system 9 follow a path including line switch switch 201, microprocessor 205, the control line 215 of the data bus 210, and the service interface controller microprocessor 250. This path represents the normal communication path through the switching communication controller 8, which also acts as a concentrator for this purpose.

The counterpart of the subscriber service interface circuit 200 to the data service system 10 is the data service interface circuit 225, which has the same construction and basically the same operation as its counterpart. Switch control of the switches 231 and 232 within the data service interface circuit 225 is effected by the data service interface microprocessor 235 in response to the service interface controller microprocessor 250 to connect the appropriate pair of the internal data bus 210 carrying the subscriber's data to an available one of eight data service lines extending to the data service system 10. The data service lines each consist of a send-data line and a receive-data line with modems 236, 238 being provided at the respective ends thereof. As seen in FIG. 8, the switches 231 and 232 are operated together to provide a tandem connection of the bus 210 to the lines of the data service system 10; however, only the switch 231 is essential in this path.

For transmission of meter reading, alarm and control signals, the system operates to transfer information from the subscriber control processor 110 to the subscriber service interface microprocessor 205 via the telephone lines, from which the information is passed to the service interface controller microprocessor 250 via data bus 215 for forwarding to the central control system 9, and the flow of information in the other direction follows the reverse path. Such communication is effected in accordance with the system protocol, which will be described in more detail hereinafter. However, for data service to be extended to the subscriber, the communication link from the subscriber data system 1 must be switched by the switching communication controller 8.

The operation of the switching communication controller 8 for a data service operation will now be described. From this description it will be noted that the half-duplex link between the switching communication controller 8 and the subscriber data system 1 feeds back all data on the transmit circuit to the receive circuit. At the subscriber data service 1, feedback of data from the bus interface unit 3' onto the data bus 2 is inhibited within the subscriber data system 1. However, any data transmitted by the data service system 10 will be fed back by the switching communication controller 8 over the full duplex link between the switching communication controller 8 and the data service system 10 to the data service system receive circuit. This feedback may be inhibited or used for error checking by the data service system 10.

A request for data service is initiated with the user entering his command through the terminal key pad 5, which raises a request-to-send (RTS) condition through the data service terminal 3" to the bus interface unit 3'. The bus interface unit 3' goes into a wait state until it is next polled by the subscriber data system 1, which will generate a poll requesting any pending commands from the bus interface unit 3'.

The bus interface unit 3' will respond to a poll from the subscriber data system 1 by transmitting a request-to-send (RTS) control message on the subscriber data bus 2. As part of its communication protocol, the subscriber data system 1 will acknowledge successful receipt of the message and using the line contention protocol established for its communications with the switching communication controller 8, will immediately relay the request-to-send control message to the microprocessor 205 in the subscriber service interface 200 via line switch 201. The subscriber service interface microprocessor 205 will acknowledge successful receipt of the message, queue the message for transmission to the service interface controller microprocessor 250 and will wait until it is polled by the microprocessor 250, which is continously scanning the subscriber service interface circuits 200 and data service interface circuits 225 which share its common communication bus 210. When the requesting subscriber service interface 200 is polled to determine if any upstream messages are pending, the interface circuit 200 will transmit the request-to-send control message, which now includes both the subscriber identification and the identification of the particular subscriber service interface circuit 200, to the microprocessor 250 via lines 215 of the bus 250.

The subscriber interface controller microprocessor 250 will acknowledge successful receipt of and process the request-to-send control message by scanning the current data service line allocation table in its memory to determine the availability of one of the twenty-four bus lines to the appropriate data service interface circuits 225. Assuming a line is available, it is assigned to the requesting subscriber and the corresponding switch control commands are forwarded as switch control messages to the requesting subscriber service interface microprocessor 205 and data service interface microprocessor 235 of the interface circuit 225 specified from the allocation table.

The service interface controller microprocessor 250 now waits until its polling sequence reaches the specified data service interface 225, at which time it will transmit its poll, with the switch control message embedded therein, to the designated interface circuit 225, which will acknowledge successful receipt of the message and execute the specified switch command to connect the designated data service line onto the specified lines of the internal data bus 210. When the polling sequence of the service interface controller microprocessor 250 reaches the requesting subscriber service interface 200, the circuit 250 will transmit its poll, with the switch control message embedded therein to the requesting subscriber service interface 200. Using the line contention protocol, the subscriber service interface 200 will at that time transmit a control message to the subscriber data system 1 which indicates successful assignment of a data service line and directs the subscriber data service to switch its incoming line to the subscriber data bus 2.

The subscriber data system 1 will acknowledge successful receipt of the message and after the acknowledge message has been transmitted to the subscriber service interface 200, it will switch the line over so that it interfaces with the bus interface unit 3' over the subscriber data bus 2.

Receipt of the acknowledged message by the subscriber service interface 200 initiates the switching of the subscriber's line onto the specified line on the internal data bus 210 via the switches 201 and 202. This should occur at about the same time as the subscriber data system 1 switches its upstream line to the telephone link, so that the transmit data line of the subscriber data bus 2 is now directly linked from the bus interface unit 3' to a port in the data service system 10.

The subscriber data system will then forward a clear-to-send control message to the bus interface unit 3' which will acknowledge successful receipt of the message and forward it to the data service terminal 3". Upon receipt of its clear-to-send signal, the terminal 3" transmits its waiting command directly to the data service system 10. The data service terminal 3" should then immediately begin looking for the response from the data service system 10.

The data service system 10 will recognized the end of the upstream message request from the format of the message received from the data service terminal 3", and this will cause the data service system 10 to react to the request by locating and formatting the requested display data. This processing may require the data service system 10 to link a subscriber's requests to prior requests through the subscriber's indentification data passed with the request. Since the line has already been switched over, the data service system 10 will transmit the downstream response through the same port through which the request was received.

The subscriber service interface microprocessor 205 will be the first to recognize the end of the downstream response when its downstream line activity monitor 203 times out. The subscriber data system 1 will also monitor the line activity to determine the end of the downstream transmission. Once this has occurred, the subscriber service interface microprocessor 205 will control the bus switch 202 to switch the subscriber's line off the internal data bus 201 and control the line switch 201 to connect the line from the subscriber data system 1 back to the subscriber service interface microprocessor 205. At this time, the subscriber data system 1 also switches the communication line off the subscriber data bus 2 and reestablishes communications with the subscriber service interface 200 for purposes for sending any pending upstream alarms or meter readings for forwarding through the service interface controller microprocessor 250 via line 215 to the central control system 9. If no alarm or meter reading messages are pending, a simple poll message is sent to notify the subscriber service interface that it may transmit any pending downstream meassages from the central control system 9 for the subscriber data system 1.

Since there are far fewer data service ports than subscribers, there is a possibility that a subscriber request cannot be serviced due to all links being allocated. The data service system 10 will therefore be considered busy when all available data links are currently allocated. Under such circumstances, the service interface controller microprocessor 250, when it detects the busy condition upon reference to its data service line allocation table, will send a busy message through the subscriber service interface 200 to the subscriber data system 1 from which the message is forwarded on the subscriber data bus 2 to the bus interface unit 3'. The bus interface unit 3' could immediately retry by sending a request-to-send message to the subscriber data system on the next poll, or it may terminate the transaction and require the subscriber to cause a retry.

Figure 9:
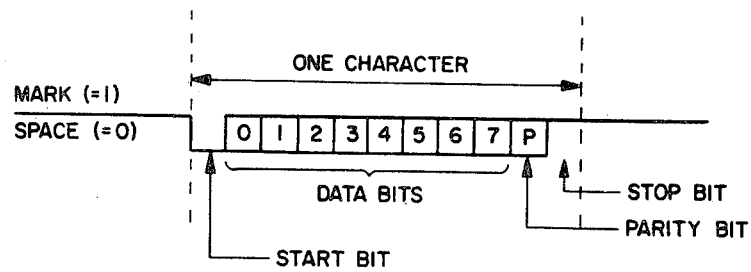
FIG. 9 is a diagram showing the format of an information character forming the basic message unit of communication in the system.

The system in accordance with the present invention is a computer-based data communications system which requires a data link control, i.e., a line protocol, to permit orderly and efficient use of the communications facilities available. All communications are in asynchronously-transmitted characters which include one start bit, eight data bits, one parity bit, and one stop bit, as seen in FIG. 9. Data bits are designated 0 through 7 from the least-significant bit to the most—significant bit and are transmitted in that order. Character parity may, for example, be even, so that the parity bit is set to force an even number of "1" bits when taken with the data bits. With eight data bits, this will ensure that at least two bits (including the start bit) will be 0 for each character. This will serve to reduce the number of undetected errors from spurious characters received due to noise occurring on the data links.

Figure 10:
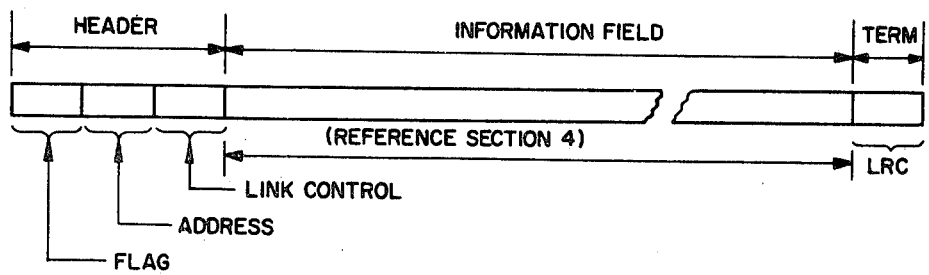
FIG. 10 is a diagram of the packet format for communications in the system.

All communications will be units known as packets, each packet being divided into three parts including a header, the information field, and a terminator as seen in FIG. 10. The packet header consists of three one character fields representing a flag, an address field, and a link control field.

The start of a packet shall be identified by the receipt of a unique flag character followed by a non-flag character. Thereafter all characters with the same value as the flag are treated in context and not as flag characters until after receipt of the packets terminator. The address field is used to identify elements within the system, the address field for downstream packets indicating the destination of the packet, and for upstream packets, the address field showing the station originating the packet. For example, a subscriber service interface circuit 200 will identify itself in the address field for packets sent to the service interface controller microprocessor 250.

Figure 11:
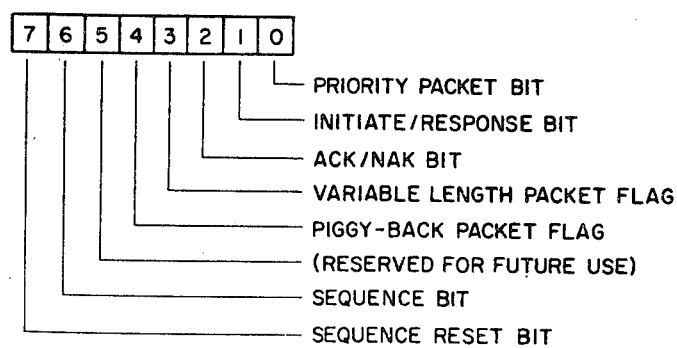
FIG. 11 is a diagram showing the allocation of the link control bits in the header of each packet.

The link control field in the header will contain information relative to the format and validation of the packet itself. The common bit assignments for this link control field are indicated in FIG. 11 and comprise a priority packet bit, an initiate/response bit, an ACK-/NAK bit, a variable length packet flag, a piggy-back packet flag, a sequence bit and a sequence reset bit.

The initiate/response bit of the link control field (1 for initiate; 0 for response) is used to designate when a response is required. All packets in the system will require an acknowledge or negative acknowledge (ACK/NAK) except for ACK/NAK packets themselves. Thus, a packet with this bit set for response implies that the packet contains only an ACK/NAK and no further information.

The ACK/NAK bit (1 for ACK; 0 for NAK) is used by a receiving station to return the status of the received packet to the transmitting station. The ACK ("good" packet) or NAK ("bad" packet) information is interpreted to terminate the transaction or cause retransmission on poll, respectively. The initiate/response (I/R) and the ACK/NAK bits are used together to show the contents of the information field, so that even the one message per packet format permits a packet to carry an ACK from the last transmission and a new message in the information field. For example, when the I/R and ACK/NAK bits are both zero, it is an indication that the packet contains an NAK response only and that the information field is to be disregarded. Where the I/R bit is zero and the ACK/NAK bit is one, the packet contains an ACK response only and the information field is to be disregarded. Where the I/R bit is one, and the ACK/NAK bit is zero, the packet contains a new message with no ACK/NAK implied or the message relates to a poll with a NAK. Finally, if the I/R bit is one and the ACK/NAK bit is one, the packet contains a new message and an ACK to the last-received packet.

The sequence bit in the link control field of the header is used to identify the packet sequence, odd or even, in recognizing lost or garbled packets. A definite response (ACK or NAK) is required for all packets except those containing only an ACK/NAK, i.e., where the I/R response bit is zero. The station initiating the transaction will update its transmit sequence bit, as stored in memory, upon receipt of an ACK from the destination. This means that each processor must retain two sequence bits (transmitted packets and received packets) for each station with which it communicates, these sequence bits being stored in memory at the particular station. The received packet sequence bit is updated at the station when the ACK is issued unless there has been a sequence bit error. This particular sequence control will be described by way of example with reference to FIGS. 12a through 12e.

Figure 12A:
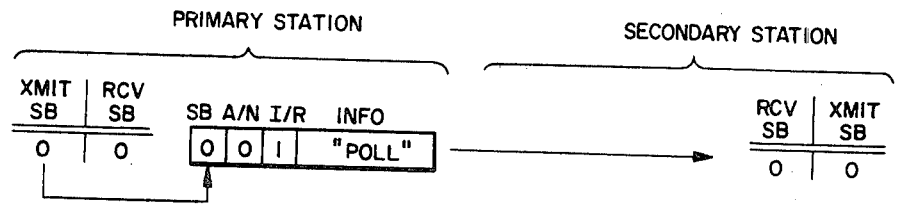
FIGS. 12a–12e are operational diagrams showing a typical data transfer operation.
Figure 12B:
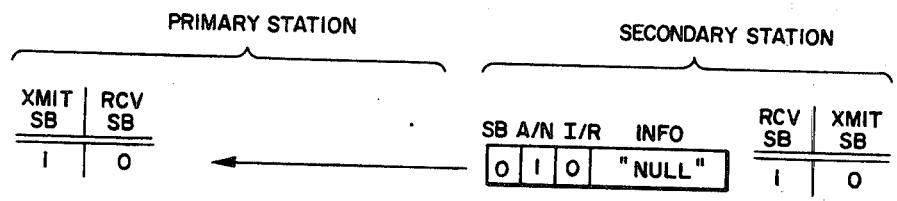
Figure 12C:
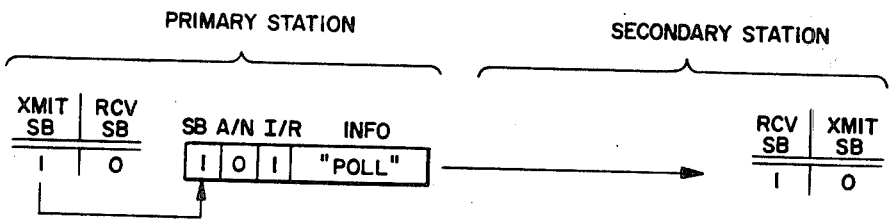

In multipoint data links, the station designated as the primary initiates all transactions. That station initiates a packet transmission with the sequence bit as updated from its last transaction to poll the secondary (receiving) station as illustrated in FIG. 12a. Since the receiving station was expecting the received sequence bit (and the packet was otherwise valid), it updates its received sequence bit and then generates its response. If it has no message to return, it responds with only the ACK, as illustrated in FIG. 12b. The primary station recognizes the ACK, and updates its transmit sequence bit since the secondary station response was an ACK only, its sequence bit will be disregarded.

Figure 12D:
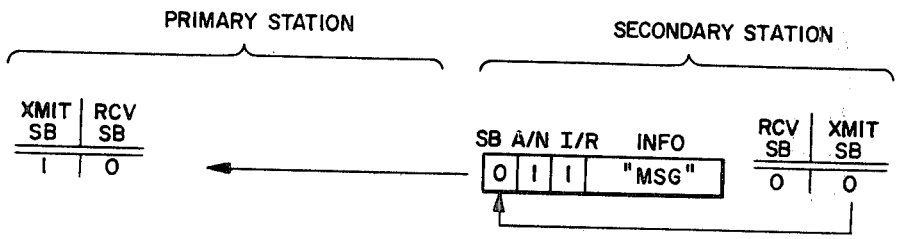
Figure 12E:
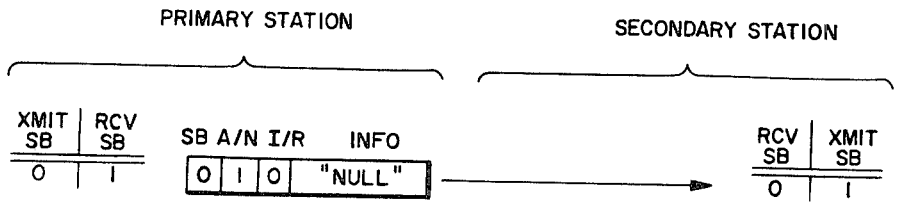

At the next transaction, the primary station will once again poll the secondary station in the manner described above, as seen in FIG. 12c. This time the sequence bit is "1". Once again, the secondary station will recognize the sequence bit as that which was expected and will acknowledge the packet receipt to the primary station. If the secondary station has data to return, it will simultaneously initiate a second transaction, as seen in FIG. 12d. The receipt of the acknowledge (ACK) will cause the primary station to update its transmission sequence bit, and at the same time, the sequence bit received being the same as that expected, the primary station also updates its received sequence bit and transmits an acknowledge (ACK). Receipt of an ACK by the secondary station will cause it to update its transmission sequence bit as illustrated in FIG. 12e.

The sequence bit allows detection of an error condition where an acknowledge response is lost and the originating station retransmits. The receiving station detects the retransmission and, expecting a new packet because it had acknowledged the previous packet, recognizes the fact that it was duplication because of the "incorrect" sequence bit. These received duplications would be ignored and the acknowledge (possibly containing a message as well) would be retransmitted. An example of the sequence of events which occur during such an erroneous transmission is illustrated in FIGS. 13a-13d.

Figure 13A:
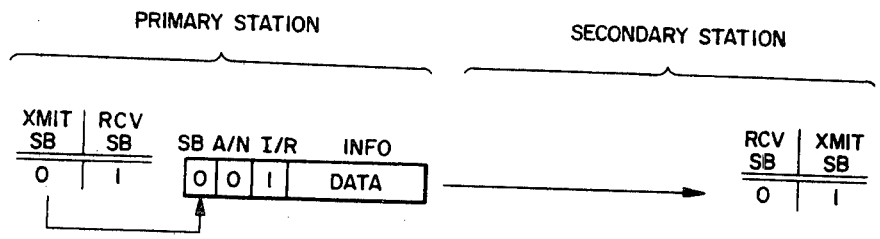
FIGS. 13a–13d are operational diagrams showing a data transfer operation involving a transmission error.
Figure 13B:
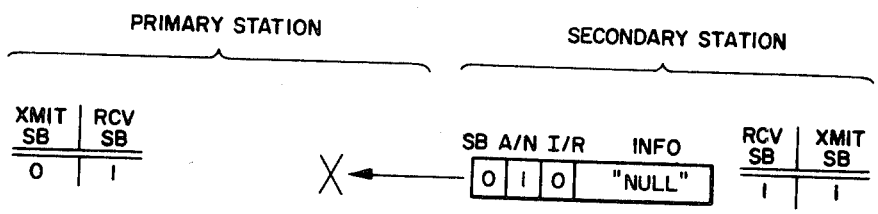
Figure 13C:
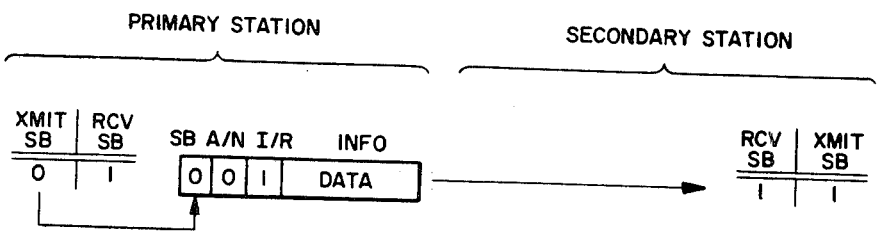
Figure 13D:
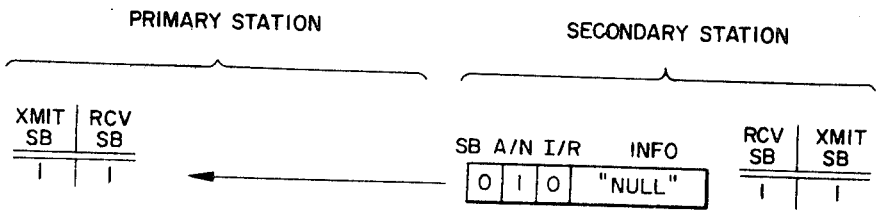

Assuming that the operation described in connection with FIG. 12 continues and that the primary station forwards a packet including data to the secondary station, as indicated in FIG. 13a, the secondary station will validate the packet and recognize the expected sequence bit. It will then update its received packet sequence bit and issues an acknowledge as indicated in FIG. 13b. However, if the ACK response is garbled or otherwise lost before the primary station receives it, the primary station will time out and assume that its transmission was lost and that it must retransmit the original packet as seen in FIGS. 13c. The secondary station receives a sequence bit equal to zero in this packet transmission while expecting a one. This tells the secondary station that the packet is a repetition of the last packet and should be discarded. The receive packet sequence bit is not updated, but the acknowledge response is retransmitted to the primary station, as illustrated in FIG. 13d. The received ACK causes the primary station to update its transmitted packet sequence bit. This problem does not arise if an NAK response is lost since the transmitting station time out has the same effect as receipt of the lost NAK.

Initialization and resynchronization of the sequence bit are handled by use of a sequence reset bit in the link control field of the header. For normal operations, as in the examples described in connection with FIGS. 12 and 13, this bit is zero; however, when a packet is the first transmitted after processor powerup (initialization) or after lost communications are reestablished (resynchronization), the initialized station will set its own sequence bits to zero and set the sequence reset bit to one. A one in this bit position directs the receiving station to accept the packet regardless of sequence bit value and to reset its own sequence bits to zero, i.e., the next packet initiated by each station will have a sequence bit equal to zero. A sequence reset is considered an initiate packet and requires a response, even though the I/R bit may not be set.

Three examples of situations where the sequence reset bit is used will be described in connection with FIGS. 14, 15 and 16. In all three cases, the transmissions are simple poll/responses; however, it should be clear that cases where messages are passed in the information field are also handled in the same way.

Figure 14A:
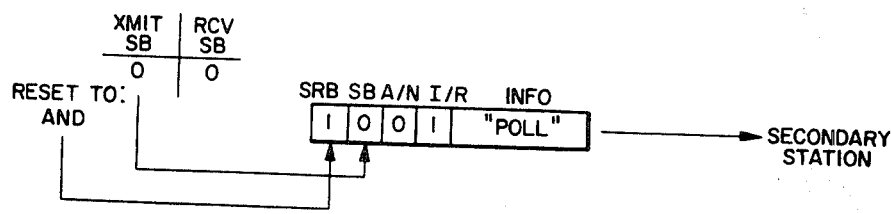
FIGS. 14a–14c are operational diagrams showing one example of the sequence reset operation in accordance with the present invention.
Figure 14B:
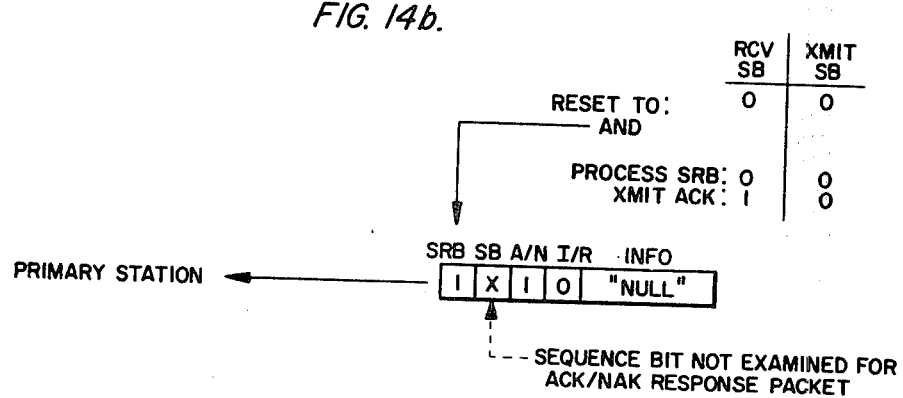
Figure 14C:
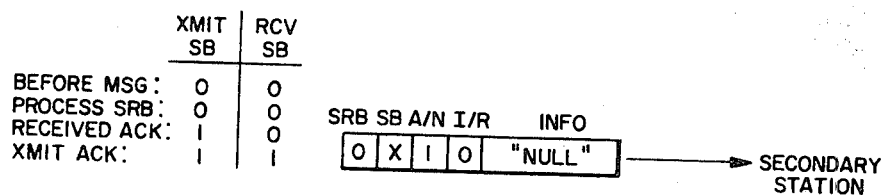

In the first example, the normal recovery/initialization sequence occurs when both the primary and secondary station recognize that they have lost communications. In this case, each station will attempt to control recovery from its end by sending a sequence reset bit packet. Since the primary station must initiate any transactions, its poll will be the first transmission. Since it has recognized the lack of communications, it has already reset to zero both of its sequence bits and has set the sequence reset bit for all polls while attempting to reestablish communication, as seen in FIG. 14a. Since the secondary station also recognized the fact that communications have been broken, it has reset both of its sequence bits and is ready to respond to the sequence reset bit set to the first poll from the primary station. The received sequence reset bit causes it to reset those sequence bits (no change in this case), as seen in FIG. 14b, and acknowledge the packet because it is both a poll and a sequence reset packet. The primary station first recognizes that the sequence reset bit is set, and therefore resets its sequence bits. It then recognizes the acknowledge indication from the secondary station, updating its transmit sequence bit and then transmits an acknowledge for the sequence reset packet, updating its received sequence bit, as seen in FIG. 14c. In response, the secondary station updates its transmit sequence bit. The initialization process is now complete with both stations having the same sequence bit configuration and therefore ready for the next transaction using the normal operations already described.

Figure 15A:
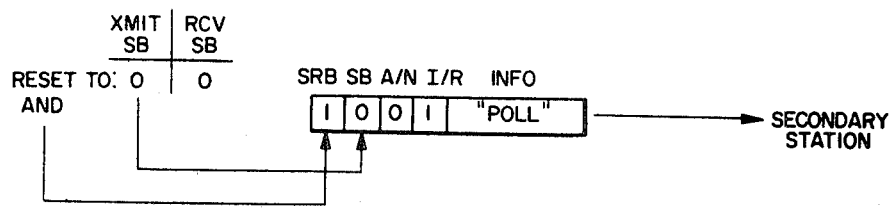
FIGS. 15a and 15b are operational diagrams showing another example of the sequence reset operation.
Figure 15B:
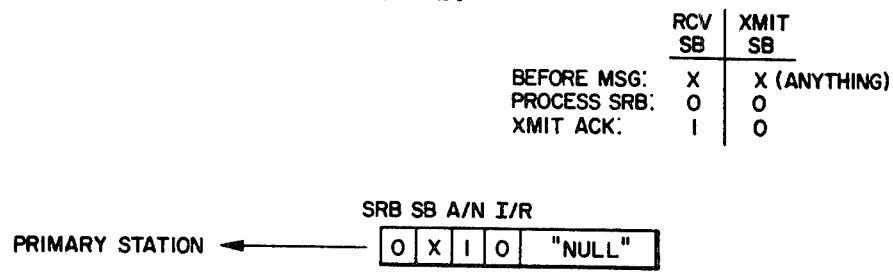

In the second example, if the primary station assumes that the secondary station has gone off-line, but the secondary station assumes it has had continuous communications available, then only the primary station will send a sequence reset packet. This case can arise, for example, if the primary processor fails and automatically restarts within the secondary stations poll time-out interval. In this case, the primary station will recognize its need to resynchronize the sequence bit and will respond, as in the first example, by sending a poll with the sequence reset bit set, as seen in FIG. 15a. The secondary station will process the sequence reset bit flag by resetting both of its sequence bits and issuing an acknowledge back to the primary station, as seen in FIG. 15b. The received acknowledge causes the primary station to update its transmitted sequence bit. This terminates the transaction with both stations holding the same sequence bit configuration.

Figure 16A:
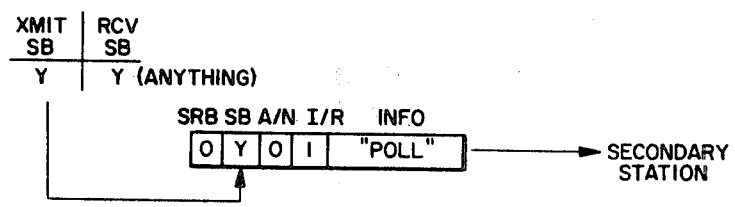
FIGS. 16a and 16b are operational diagrams showing still another example of the sequence reset operation.
Figure 16B:
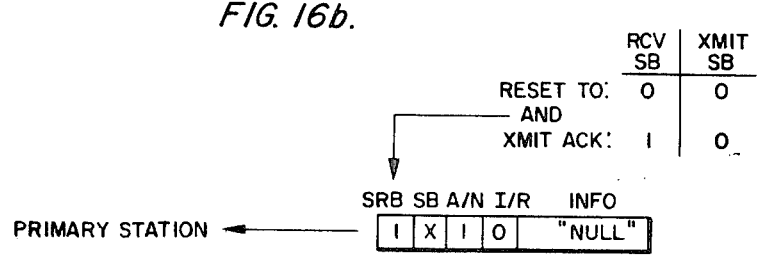

In the third example, the primary station shows the secondary station as on-line, but the secondary station assumes that it has lost communications. Such a case, which is the converse of the situation described in the second example, could arise if the secondary station should fail and recover between polls from the primary station. In this case, the primary station would send a poll as if everything were normal, as seen in FIG. 16a. As in the first example, the secondary station has gone into recovery operations having reset its sequence bits and is waiting to transmit a sequence reset bit. Since the secondary station has reset both of its sequence bits, it does not known what the expected sequence bit from the primary should be, and it must ignore the received sequence bit. As seen in FIG. 16b, the secondary station acknowledges the poll with the waiting sequence reset packet. In response to this sequence reset packet, the primary station will reset its sequence bits, at which point the acknowledge to the poll is recognized, resulting in the update of the transmit sequence bit. Finally, the primary acknowledges the sequence reset packet and the secondary station concludes the transaction by updating its transmit sequence bit on receipt of the acknowledge. Again, both stations are now ready for normal operations.

The terminator field of each packet will provide an additional level of confidence that the packet was correctly received. The terminator for all communications shall consist of a one character longitudinal redudancy check (LRC). The LRC shall be defined as the bit-wise modulo-2 sum of all characters except the flag character. This may be implemented as a result of applying an EXCLUSIVE-OR logical operation on the partial result for each successive character. The receiving station must correctly receive a valid LRC before performing any further processing on a packet.

The priority packet bit which forms part of the link control field as seen in FIG. 11 is used to flag high-precedence packets for priority processing (one for priority packets; zero otherwise). The use of this bit may be reserved for emergency-category alarm messages, such as smoke, heat, intrusion, police, fire and medical alarms.

The variable length packet flag which is also included in the link control field has a fixed length for each link and use of this flag (one for variable length packets; zero for structured packets) allows the protocol to support variable length packets where the first character of the information field specifies a packet length. Such variable length packets may include one or more messages in the information field.

The piggy-back packet flag which is included in the link control field is used in a structured packet (fixed length) to identify the length of a variable length packet which follows and contains the message itself. This format calls for two packets to transmit a message which does not fit into the structure format, the second of which has the "variable length packet flag" set as described above. Use of this format offers greater protection because the length must be transmitted twice and once acknowledged before a prolonged message could be transmitted. This protects against the case where the length of the character is incorrectly received and results in long waits for additional characters which may not be coming, causing system hangups.

The system in accordance with the present invention utilizes two types of communications links, multi-point where one primary station communications with multiple secondary stations on the same link, and point-to-point involving a direct link between two stations. Multi-point data links operate with one primary (or master) station which sequentially invites the secondary (or slave) stations to send it messages, otherwise known as polling. In some systems, the converse of this, where the master station selects a station to which it sends data, is known as a "select" operation. No differentiation between these terms is required in the standard protocol since a "select" sequence also implies a "poll" sequence, following which the secondary station may respond with just an acknowledge, or with a message for the primary station.

The only point-to-point link between the major system elements involving the standard protocol is the switching communication controller to subscriber data system link. Full advantage of the dedicated nature of this link is taken through the use of a point-to-point protocol with contention. Instead of the switching communication controller repeatedly polling the subscriber data system, both alarm response times are minimized by allowing either station to initiate a message transaction. This will invariably lead at some time or another to "contention", where both stations attempt to transmit on the link simultaneously. However, the risk of this occurrence is minimized through the elimination of nonessential polling, and rapid recovery from this condition is assured through the use of different time-out periods by each station.

In the event that a message is lost or not recognized by a receiving station, it is the primary station's responsibility to recover from the failure by use of a response time-out. The response time-out periods commence with the completion of transmission of the last character of each packet transmitted by the primary station and is canceled when a complete packet is received from the addressed secondary station (where it is an error packet or not). If the response time-out period is not canceled within the allotted time, a time-out occurs. This is treated by the primary station in the same manner as the receipt of a NAK packet, in which case no response is required and the time causes an increment of the NAK counter. The primary station has the option of reissuing a poll packet to the secondary station or continuing on to another secondary station, and returning later.

Each secondary station on a multi-point link utilizes a poll time-out sequence which serves to detect when the primary station has lost contact with that secondary station. The poll time-out sequence commences with station initialization and is retriggered upon receipt of a poll packet with the expected (alternating sequence) bit (or with the sequence reset bit set).

While the switching communication controller 8 has been described in FIG. 8 as connecting a data service system 10 to selected subscriber data systems, it is within the scope of the present invention to provide connection of the subscriber data systems to other services in a similar way, such as to the packet switching system 18 shown in FIG. 1, as well as other types of communication systems. Indeed, the invention is not to be limited to the details of the exemplary embodiments specifically disclosed herein, but encompasses all of those changes and modifications which fall within the general principles set forth in this description.

What is claimed is:

1. A method of controlling the sequence of message transmission between processor-controlled stations in a communication system, where each message includes a header having at least a sequence bit indicating first and second binary states and an acknowledge bit and wherein the message may or may not be a data message, the steps comprising storing in memory at each station a transmit sequence bit and a receive sequence bit;

inserting into the header of each message transmitted from a given station a sequence bit having the state of the transmit sequence bit stored at that station;

switching the state of the stored transmit sequence bit at a station upon receipt of a message having an acknowledge bit;

switching the state of the stored receive sequence bit at a station upon receipt of a data message having a sequence bit whose state corresponds to that of the stored receive sequence bit at that station and returning a message having an acknowledge bit;

retransmitting from a given station a message previously transmitted from that station when a message having an acknowledge bit is not received from the receiving station in a predetermined time after initial transmission; and disregarding a message received at a station when the state of the sequence bit in the message is different from the state of the receive sequence bit stored at that station.

2. The method defined by claim 1, further including the steps of detecting system power-up or resynchronization conditions at any given station;

inserting a sequence reset bit into the header of a message and switching the state of both the receive sequence bit and the transmit sequence bit to their first binary state as stored at said given station in response to detection of either of said conditions;

inserting a sequence reset bit into the header of a message and switching the state of both the receive sequence bit and the transmit sequence bit to their first binary state as stored at said given station in response to detection of either of said conditions;

resetting the state of both the receive sequence bit and the transmit sequence bit to their first binary state as stored at a station receiving a message in response to detection of a reset sequence bit in that message and returning a message having an acknowledge bit to the given station; and in response to receipt of said given station of a message having an acknowledge bit while the sequence reset bit is set at that station, returning a message having an acknowledge bit to said receiving station.

3. The method defined by claim 2, wherein in response to receipt of a message having a reset sequence bit, the state of the sequence bit in that message is ignored.

4. The method defined by claim 1, wherein the state of the stored receive sequence bit at a station is not switched upon receipt of a non-data message.

5. The method defined in claim 1, wherein said data messages may include poll data or message data.

6. The method defined in claim 1, further including the step of inserting into the header of each message a bit indicating whether a response is required to the message.

* * * * *